(12) United States Patent
Jones et al.

(10) Patent No.: US 8,265,930 B1
(45) Date of Patent: Sep. 11, 2012

(54) SYSTEM AND METHOD FOR RECORDING VOICE DATA AND CONVERTING VOICE DATA TO A TEXT FILE

(75) Inventors: Bryce A. Jones, Overland Park, KS (US); Raymond Edward Dickensheets, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1030 days.

(21) Appl. No.: 11/104,942

(22) Filed: Apr. 13, 2005

(51) Int. Cl.
*G10L 15/26* (2006.01)

(52) U.S. Cl. ........ 704/235; 704/201; 704/243; 704/254; 704/256.1; 704/256.2; 704/260; 704/267; 704/275; 379/88.01; 379/88.22; 379/93.24

(58) Field of Classification Search .................. 704/235, 704/275, 260, 201, 243, 254, 256.1, 256.2, 704/267; 379/88.01, 88.22, 93.24
See application file for complete search history.

(56) References Cited

U.S. PATENT DOCUMENTS

| | | | | |
|---|---|---|---|---|
| 5,913,192 A * | 6/1999 | Parthasarathy et al. | .... | 704/256.1 |
| 6,085,160 A * | 7/2000 | D'hoore et al. | ............ | 704/256.2 |
| 6,119,086 A * | 9/2000 | Ittycheriah et al. | ........... | 704/267 |
| 6,415,257 B1 * | 7/2002 | Junqua et al. | ................. | 704/275 |
| 6,513,003 B1 * | 1/2003 | Angell et al. | ................. | 704/235 |
| 6,775,651 B1 * | 8/2004 | Lewis et al. | .................... | 704/235 |
| 6,820,055 B2 * | 11/2004 | Saindon et al. | ............... | 704/235 |
| 6,980,953 B1 * | 12/2005 | Kanevsky et al. | ............ | 704/235 |
| 2002/0091511 A1 * | 7/2002 | Hellwig et al. | ............... | 704/201 |
| 2002/0161579 A1 * | 10/2002 | Saindon et al. | ............... | 704/235 |
| 2003/0101054 A1 * | 5/2003 | Davis et al. | .................... | 704/235 |
| 2003/0125950 A1 * | 7/2003 | Avila et al. | .................... | 704/260 |
| 2003/0187641 A1 * | 10/2003 | Moore et al. | ................... | 704/235 |
| 2003/0220784 A1 * | 11/2003 | Fellenstein et al. | ........... | 704/201 |
| 2004/0088162 A1 * | 5/2004 | He et al. | ........................ | 704/235 |
| 2005/0033575 A1 * | 2/2005 | Schneider | ...................... | 704/254 |
| 2006/0041427 A1 * | 2/2006 | Yegnanarayanan et al. | .. | 704/235 |
| 2006/0074656 A1 * | 4/2006 | Mathias et al. | ............... | 704/243 |

* cited by examiner

*Primary Examiner* — Michael Colucci

(57) ABSTRACT

The present invention relates to recording voice data using a voice communication device connected to a communication network and converting the voice data into a text file for delivery to a text communication device. In accordance with the present invention, the voice communication device may transfer the voice data in real-time or store the voice data on the device to be transmitted at a later time. Transcribing the voice data into a text file may be accomplished by automated computer software, either speaker-independent or speaker-dependent or by a human who transcribes the voice data into a text file. After transcribing the voice data into a text file, the text file may be delivered to a text communication device in a number of ways, such as email, file transfer protocol (FTP), or hypertext transfer protocol (HTTP).

27 Claims, 10 Drawing Sheets

SYSTEM AND METHOD FOR RECORDING VOICE DATA AND CONVERTING VOICE DATA TO A TEXT FILE

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to recording voice data and converting the voice data to a text file. More particularly, the present invention relates to recording voice data and converting voice data to a text file via a remote, hand-held device, such as a mobile telephone, connected wirelessly to a network.

BACKGROUND OF THE INVENTION

Many individuals utilize voice recorders to memorialize information and ideas. Voice recorders have used recording media such as analog tape. More recently digital voice recorders have been developed that use digital voice encoders to store voice data in computer memory.

Mobile voice recorders provide a convenient mechanism for memorializing information and ideas, particularly in instances where a user is unable or unwilling to write, type, or otherwise create either physical or electronic text. Unfortunately, a voice recording may be more difficult to review, share, or utilize than text. A voice recording may, of course, be transcribed by a typist with access to the media containing the recording. A digital recording may be transcribed using software. For software transcription, portable digital voice recorders currently require a personal computer (PC) and a connection cable to transcribe the recorded data. One example is the Naturally Mobile voice recorder that connects to a PC and uses Dragon Naturally Speaking transcription software. IBM ViaVoice is another example of PC-based transcription software. The voice recording can also be accomplished on the PC itself without a portable digital voice recorder, but this requires a larger, heavier device to accomplish the task.

One skilled in the art, as well as most individuals living in the developed world, will be familiar with multiple handheld devices available to provide various mobile services, such as voice communication and data exchange. In addition to the digital voice recorders cited above, other devices include mobile telephones, personal digital assistants (PDA), and pagers, among others. The multiplicity of mobile devices can create frustration and inconvenience for users. Combining functions into single devices is more convenient and can be more economical for the user, but the combination of functions into a single device may also be limited by factors such as size, battery life, and usability.

SUMMARY OF THE INVENTION

The present invention provides a system and method to record voice data and convert the voice data into a text file. The voice data may be recorded by a voice communication device for transmission at a later time, or may be transmitted in real-time through a communication network. The communication network may be circuit-based or packet-based. The voice data may be stored in a database for subsequent transcription. The voice data stored in the database may be converted to text by one or more transcription method. The text file and, optionally, voice data may be delivered to a user's text communication device via one or more of a plurality of delivery mechanisms (email, FTP, HTTP).

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a system and method for recording voice data and converting voice data to a text file. Systems and methods in accordance with the present invention may be used with a variety of voice communication devices. While the invention will be described herein in conjunction with specific examples for purposes of illustration, other devices may be used.

Figure 1:
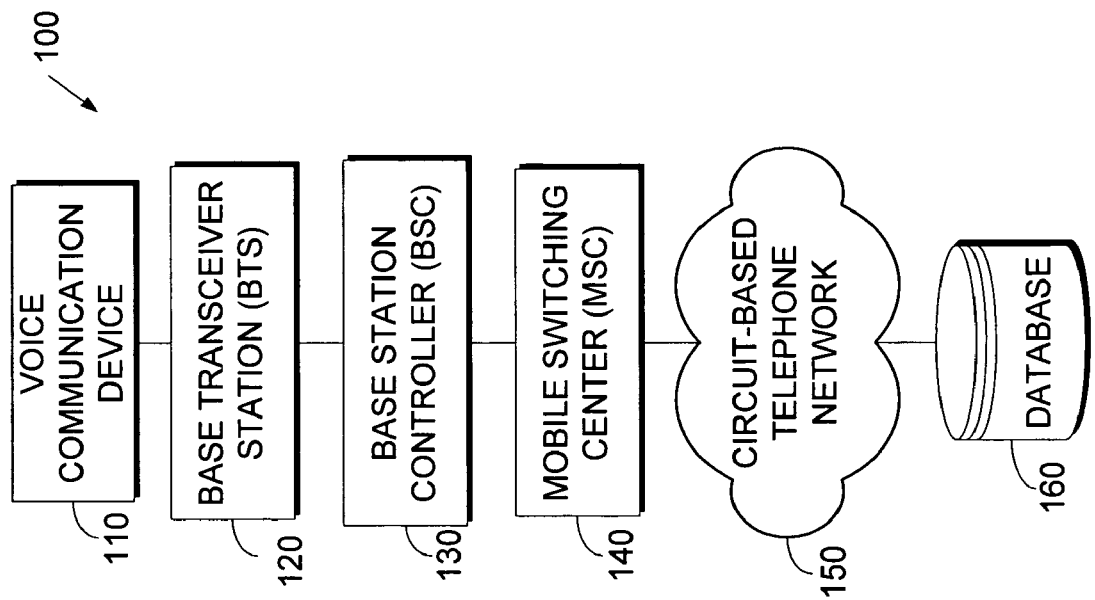
FIG. 1 illustrates an exemplary architecture for implementing the recording aspect of the present invention using a mobile voice communication device and a circuit-based network.

FIG. 1 illustrates an architecture 100 for implementing the recording aspect of the present invention using a mobile voice communication device and a circuit-based network. A mobile voice communication device 110 may connect to a base transceiver station (BTS) 120 via a wireless connection. BTS 120 may connect to a base station controller (BSC) 130 using any connection media. BSC 130 may connect to a mobile switching center (MSC) 140. MSC 140 may be connected through a circuit-based telephone network 150, such as a public switched telephone network (PSTN), to a database 160. Voice data may be transmitted from mobile voice communication device 110 in real-time to database 160. Optionally, voice data may be stored in mobile voice communication device 110 and transmitted at a later time over circuit-based telephone network 150 to database 160.

Figure 2:
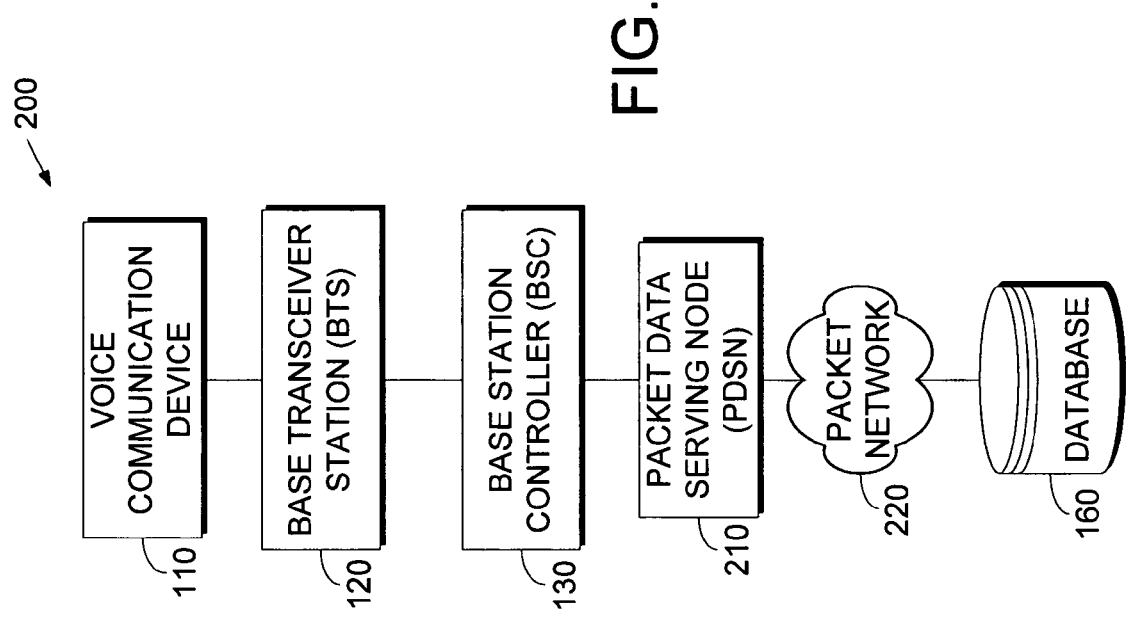
FIG. 2 illustrates a second exemplary architecture for implementing the recording aspect of the present invention using a mobile voice communication device and a packet-based network.

FIG. 2 illustrates a second architecture 200 for implementing the recording aspect of the present invention using a mobile voice communication device 110 and a packet-based network 220. Mobile voice communication device 110 may connect to BTS 120 via a wireless connection. BTS 120 may connect to BSC 130 using any connection media. BSC 130 may connect to a packet data serving node (PDSN) 210. PDSN 210 may connect through a packet-based network 220 to database 160. Voice data may be transmitted from mobile voice communication device 110 in real-time to database 160. Optionally, voice data may be stored in mobile voice communication device 110 and transmitted at a later time over packet-based network 220 to database 160.

Figure 3:
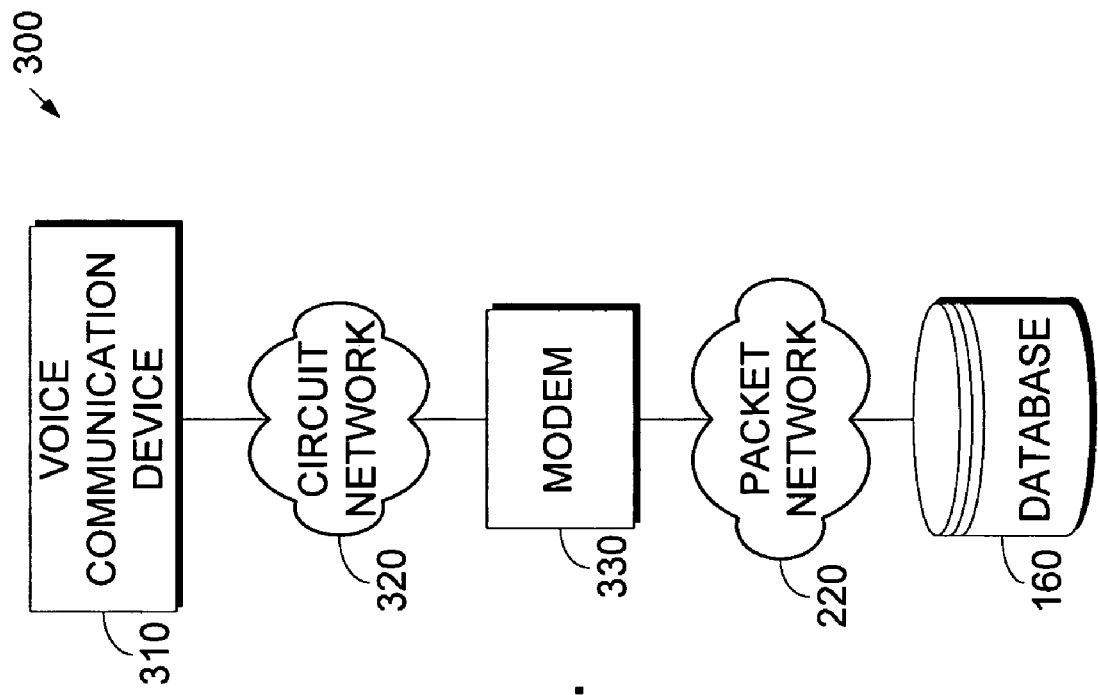
FIG. 3 illustrates a third exemplary architecture for implementing the recording aspect of the present invention using a voice communication device connected through a modem to a packet-based network.

Referring now to FIG. 3, a third architecture 300 for implementing the recording aspect of the present invention using voice communication device 310 connected through a modem 330 to packet-based network 220 is described. Voice communication device 310 may connect through a circuit based network 320 to modem 330. A further embodiment could connect voice communication device 310 to modem 330 through a local network, such as a home or office local area network, if sharing of modem 330 by multiple devices is required. Modem 330 may be connected to packet-based network 220 which also is connected to database 160. Voice communication device 310 could be, for example, a personal digital assistant (PDA) or a personal computer (PC).

Figure 4:
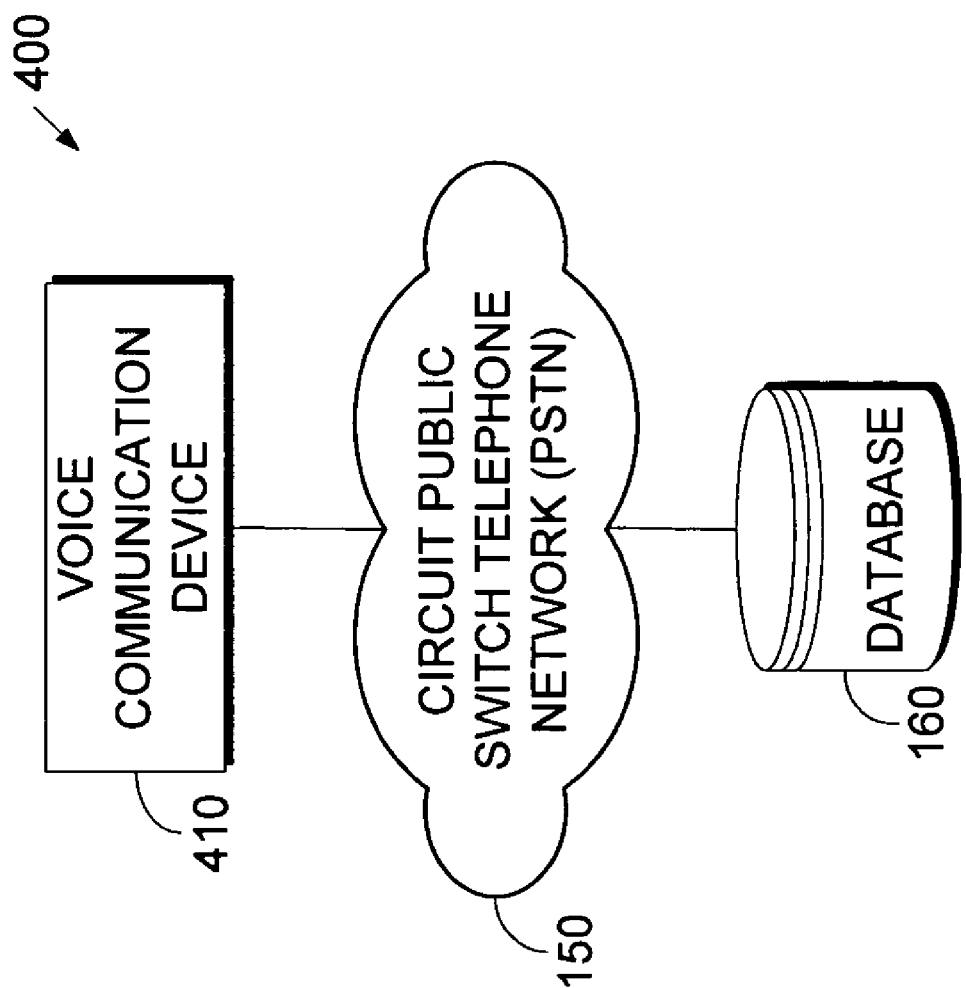
FIG. 4 illustrates a fourth exemplary architecture for implementing the recording aspect of the present invention using a voice communication device connected to a circuit-based network.

Referring now to FIG. 4, a fourth architecture 400 for implementing the recording aspect of the present invention using voice communication device 410 connected to circuit-based PSTN 150 is illustrated. Voice communication device 410 may connect directly to circuit-based PSTN 150 which may be connected to database 160. In this illustration, voice communication device 410 could be, for example, a typical land-line telephone connected to PSTN 150 to receive the voice data and transmit to database 160.

Figure 5:
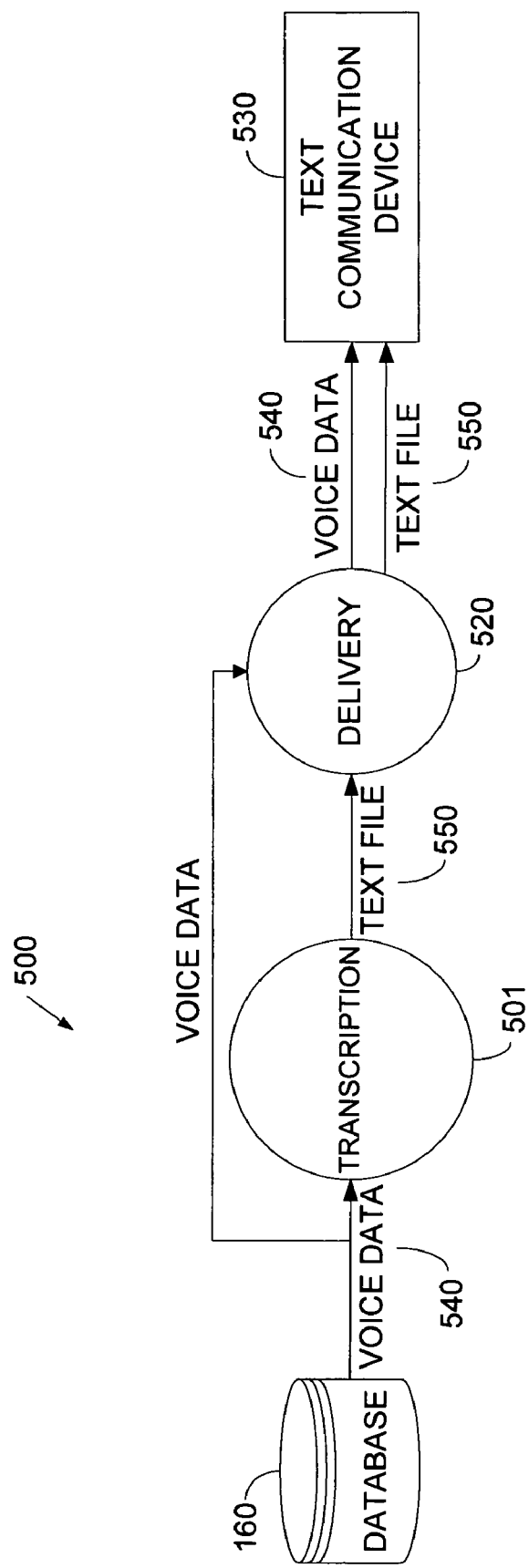
FIG. 5 illustrates a architecture for implementing the transcription and delivery aspects of the present invention.

Referring now to FIG. 5, an architecture 500 for implementing the transcription and delivery aspects of the present invention is illustrated. Database 160 may be connected to a transcription process 510. The voice data 540 may be passed to transcription process 510 to produce a text file 550. Text file 550 may be passed to a delivery process 520 which delivers voice data 540 and text file 550 to a text communication device 530. Based on user preference, either text file 550 or text file 550 and voice data 540 may be delivered to text communication device 530. Text communication device 530 may be one of a number of devices capable of receiving text data such as a mobile telephone device, a pager, a PDA, or a PC.

Figure 6:
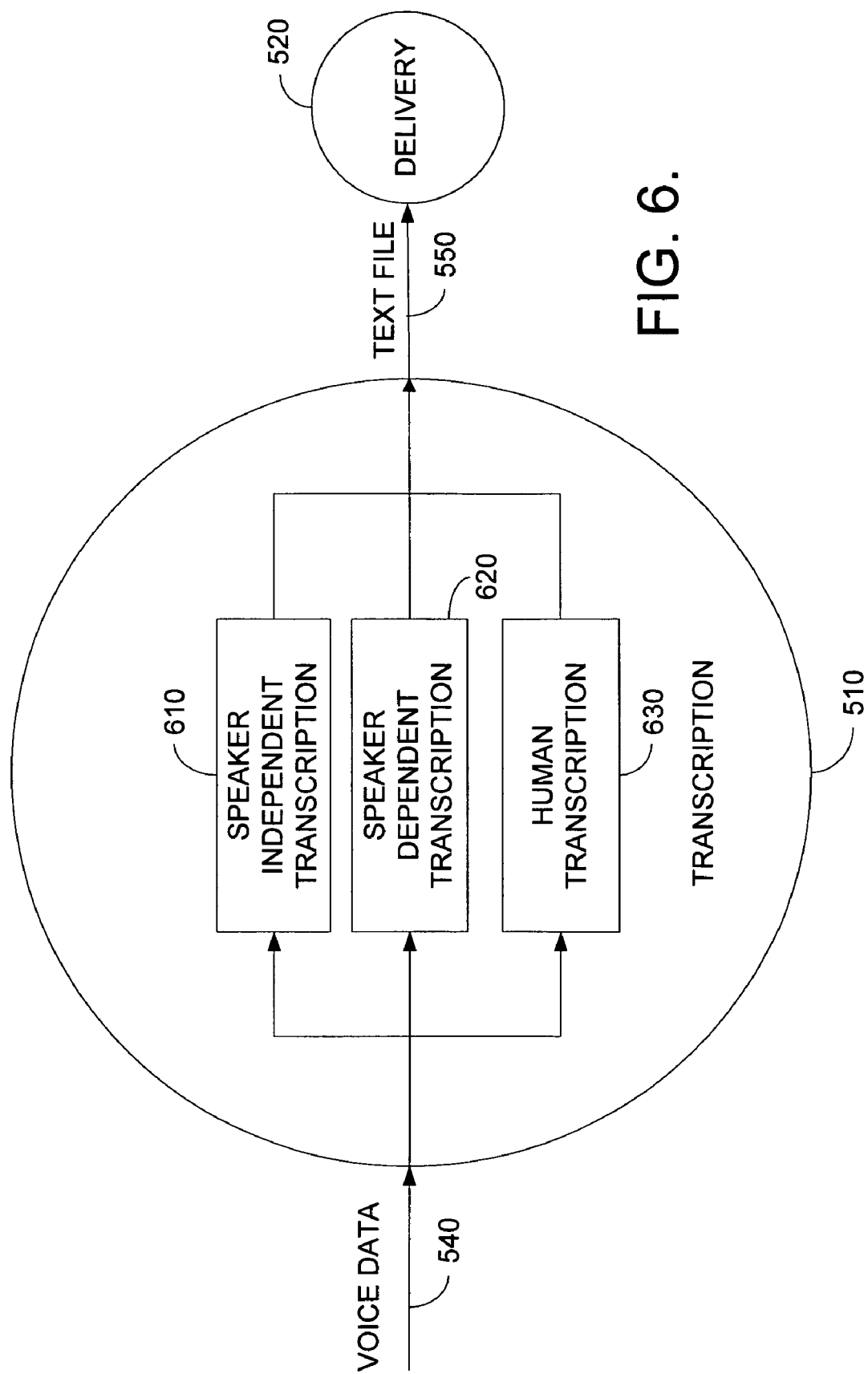
FIG. 6 illustrates a transcription process in accordance with the present invention.

Referring now to FIG. 6, possible mechanisms of transcription process 510 are illustrated. Voice data 540 may be passed into transcription process 510 and one or more transcription mechanisms may create text file 550 containing the text content of voice data 540. One skilled in the art will appreciate that not all transcription mechanisms illustrated in FIG. 6 need be used in systems and methods in accordance with the present invention and that further transcription methods may be used without departing from the scope of the present invention. To create text file 550, speaker independent transcription mechanism 610 may receive voice data 540 to process through an automated computer program requiring no calibration or learning step for an individual speaker. Sprint voicedial software, created by IBM, may be used as speaker independent transcription mechanism 610, although any other type of software may be used. Voice data 540 may be passed to a speaker dependent transcription mechanism 620. Speaker dependent transcription mechanism 620 may receive voice data 540 to process through an automated computer program which has been pre-calibrated to the individual speaker's speech patterns. Naturally speaking, software by Dragon and ViaVoice software by IBM may be used as speaker dependent transcription mechanism 620, although any other type of software may be used. Additionally or optionally voice data 540 may be passed to a human transcription mechanism 630. Human transcription mechanism 630 may involve a human listening to voice data 540 and manually creating text file 550 from the audio contents. Based on user preference one or more of the transcription mechanisms 610, 620, or 630 could be used to create text file 550. Text file 550 may be passed to delivery process 520.

Figure 7:
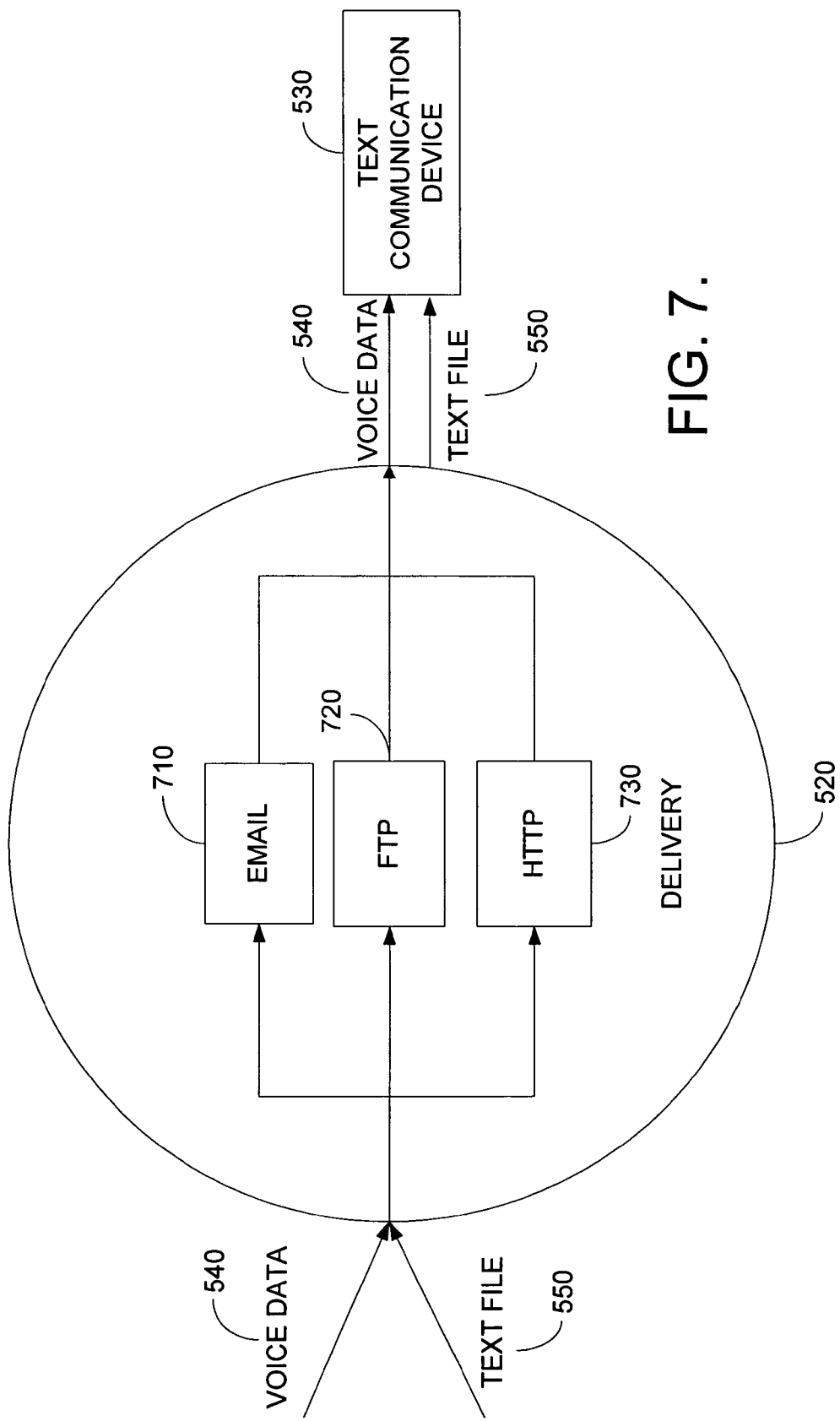
FIG. 7 illustrates a delivery process in accordance with the present invention.

Referring now to FIG. 7, a delivery process 520 is illustrated. Voice data 540 and text file 550 may be passed to delivery process 520. Delivery process 520 can be accomplished by one or more of least three different methods. First, voice data 540 and text file 550 may be attached to an email by the email process 710 and sent to text communication device 530. Optionally, text file 550 may be included as the body of the email. Also, based on user preferences, voice data 540 may be omitted from the email delivery. Second, voice data 540 and text file 550 may be retrieved via file transfer protocol (FTP) 720 by text communication device 530. In this example voice data 540 and text file 550 are stored on an HP server to be retrieved by text communication device 530. Third, voice data 540 and text file 550 may be retrieved via hypertext transfer protocol (HTTP) 730 by text communication device 530. In this example voice data 540 and text file 550 are stored on a web server and accessible as hyperlinks on a web page. Text file 550 may be downloaded to text communication device 530 or viewed as a hypertext markup language (HTML) document. Voice data 540 may be downloaded to text communication device 530 or streamed to text communication device 530 for listening by the user.

Figure 8:
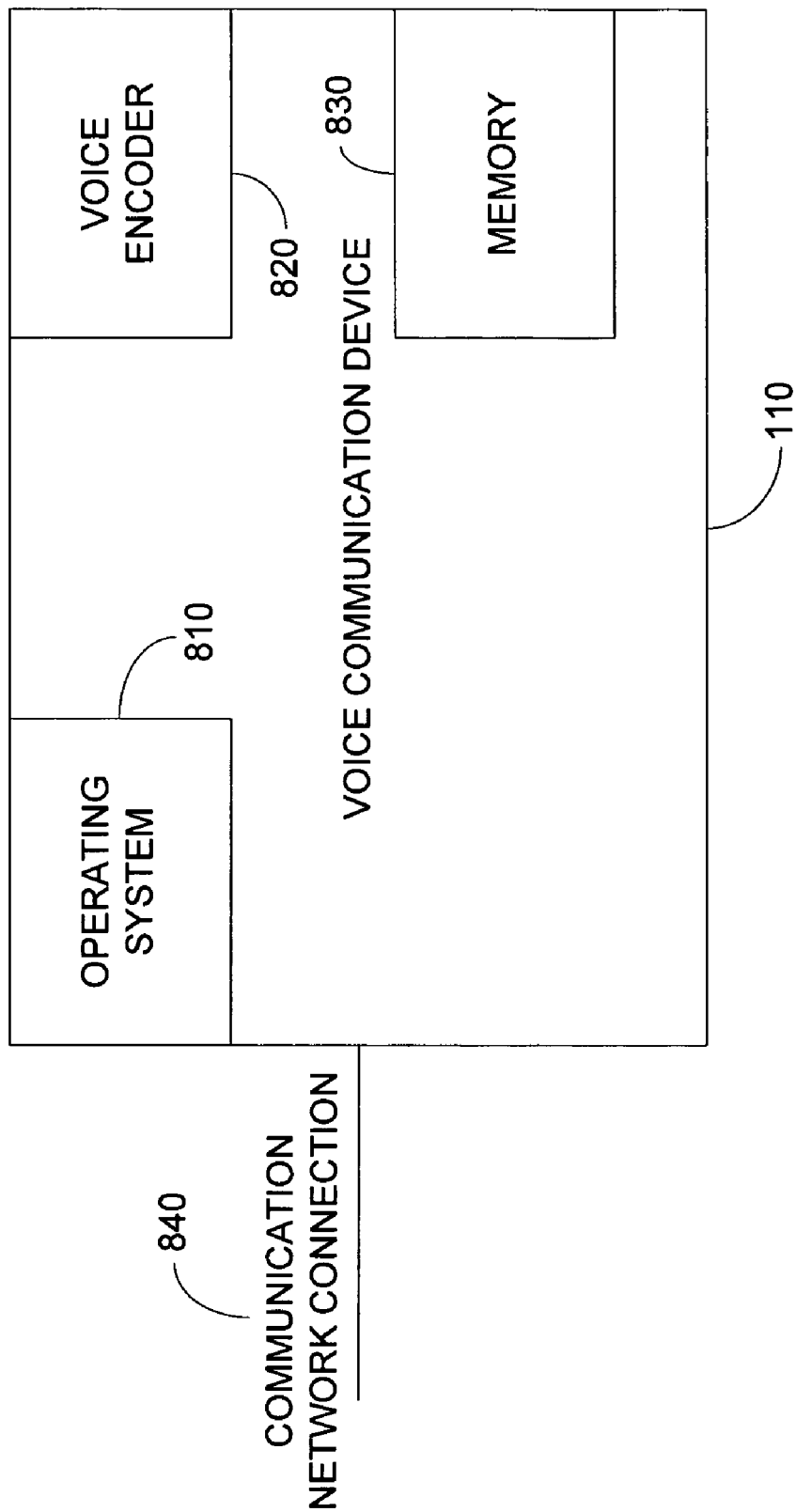
FIG. 8 illustrates components of a voice communication device suitable for use in accordance with the present invention.

Referring now to FIG. 8, components of voice communication device 110 suitable for use with the present invention are illustrated. Voice communication device 110 may contain an operating system 810, as is the case where voice communication device 110 is a mobile telephone, PDA, or a PC. Voice communication device 110 may also contain a voice encoder 820 to encode analog audio data to digital voice data. In the case where voice communication device 110 is a land-line telephone, operating system 810 and voice encoder 820 may be optional. Optionally, memory 830 may be present to store voice data for transmitting at a later time. A communication network connection 840 transmits voice data to database 160 connected to the communication network. Examples of voice communication device 110 include a mobile telephone, a wirelessly connected personal digital assistant (PDA), a landline telephone, or a personal computer equipped with voice encoding software.

Figure 9:
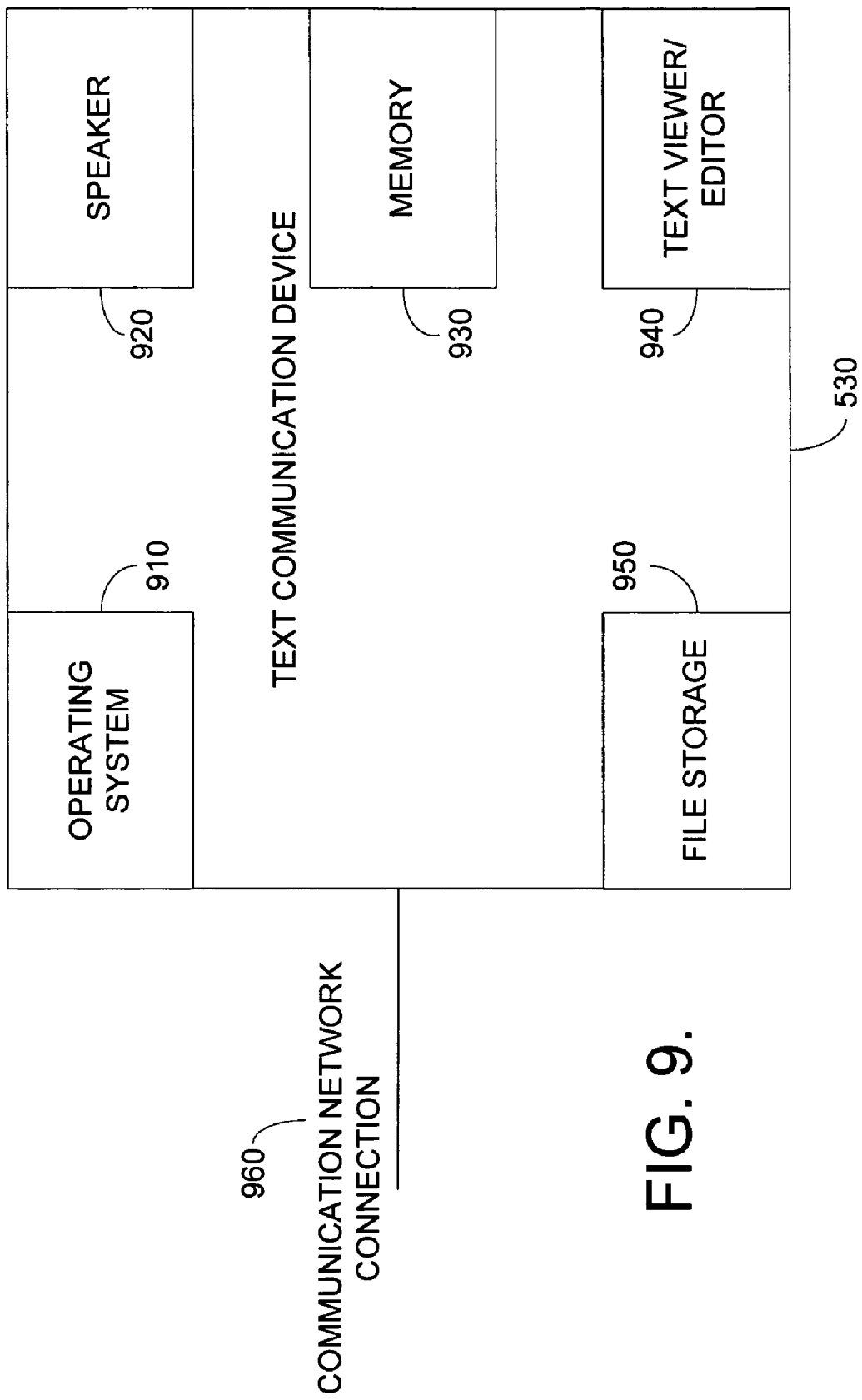
FIG. 9 illustrates components of a text communication device suitable for use in accordance with the present invention.

FIG. 9 illustrates components of text communication device 530. Text communication device 530 contains an operating system 910. Text communication device 530 may receive text file 550 and/or voice data 540. A speaker 920 may permit a user to listen to voice data 540 delivered to text communication device 530. Text communication device 530 may also contain memory 930 and file storage 950 to store voice data 540 and text file 550. A text viewer and editor 940 may be used to edit and view the contents of text file 550. A communication network connection 960 may be used to receive voice data 540 and text file 550. Examples of text communication device 530 include any device capable of receiving text data, such as a mobile telephone device, a pager, a PDA, a PC, or a television cable set-top box.

Figure 10:
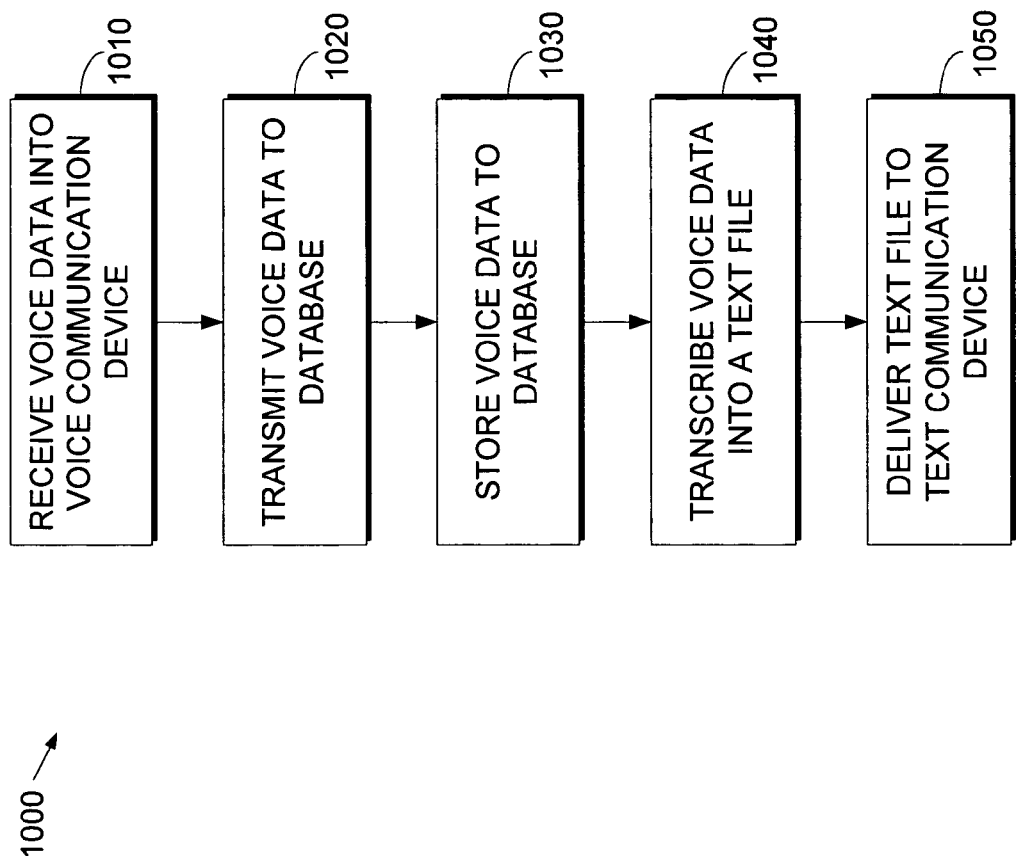
FIG. 10 illustrates a method of recording voice data and converting the voice data to a text file in accordance with the present invention.

FIG. 10 illustrates a method 1000 of recording voice data and converting the voice data to a text file in accordance with the present invention. In step 1010 of method 1000 voice data is received into a voice communication device 110. In step 1020 voice data 540 is transmitted to database 160. Voice data 540 may be received by voice communication device 110 and stored for an indeterminate time prior to transmitting voice data 540 to database 160. Alternately, voice data 540 may be transmitted in real-time as it is received by voice communication device 110. Both of these options may be implemented concurrently. In step 1030, voice data 540 is stored to database 160. The stored voice data is transcribed into text file 550 in step 1040. The transcription may be accomplished by any mechanism including by automated computer program, either speaker independent or speaker dependent, or by a human transcription. Text file 550 is delivered to text communication device 530 in step 1050. Delivery may be accomplished by one or more of a plurality of options including email, FTP and HTTP.

The invention claimed is:

1. A method for converting voice data into a text file comprising:
   receiving and maintaining user preferences from an individual, wherein the user preferences govern a format of content delivery to the individual and identify one of three mechanisms of transcription that is preferred by the individual;
   receiving voice data from the individual into a voice communication device;
   providing an identifier to the voice data that associates the individual therewith;
   transmitting the voice data and the identifier from the voice communication device through a wireless communication network to a database;
   at least temporarily storing the voice data and the identifier to the database;
   selecting the preferred one of the three mechanisms of transcription based on the received user preferences that correspond with the identifier, wherein the three mechanisms of transcription are a speaker-independent transcription mechanism, a speaker-dependent transcription mechanism, and a human transcriber;
   when the selected one of the three mechanisms of transcription is the speaker-dependent transcription mechanism, passing the voice data to the speaker-dependent transcription mechanism that is utilized to transcribe the voice data into a text file, wherein the speaker-dependent transcription mechanism is an automated computer program that is pre-calibrated by speech patterns of the individual to process the voice data transmitted via the wireless communication network therefrom;
   utilizing the speaker-dependent transcription mechanism to transcribe the voice data into a text file;
   delivering the text file or the voice data and the text file to a communication device, wherein the delivery is based on the user preferences that correspond with the identifier, wherein, when governed by the user preferences, performing the delivery by writing the text file and the voice data to a web server that is accessible to a text communication device via a hyperlink assigned to the individual.

2. The method for converting voice data into a text file of claim 1, wherein transmitting the voice data and the identifier through a communication network further comprises transmitting the voice data through a circuit-based public switched telephone network.

3. The method for converting voice data into a text file of claim 1, wherein transmitting the voice data and the identifier through a communication network further comprises transmitting the voice data through a packet-based communication network.

4. The method converting voice data into a text file of claim 1, wherein transmitting the voice data and the identifier through a communication network further comprises transmitting the voice data in real-time as the voice data is received into the voice communication device, and wherein the speaker-dependent transcription mechanism is configured to transcribe the voice data into the text file in real-time.

5. The method for converting voice data into a text file of claim 1, further comprising storing the voice data within memory located in the voice communication device prior to transmitting the voice data through a communication network.

6. The method for converting voice data into a text file of claim 1, wherein transcribing the voice data into a text file further comprises verifying the text file by an automated, speaker-independent transcription computer program that is invoked in addition to the speaker-dependent transcription mechanism.

7. The method for recording voice data and converting voice data into a text file of claim 1, wherein transcribing the voice data into a text file further comprises verifying the text file by a human transcriber that is invoked in addition to the speaker-dependent transcription mechanism.

8. The method for converting voice data into a text file of claim 1, wherein delivering the text file to a text communication device comprises generating an email that has the text file incorporated in the body thereof, wherein the email is communicated from an account established by the individual, wherein the account is identified according to the identifier.

9. The method for converting voice data into a text file of claim 4, wherein delivering the text file to a text communication device further comprises delivering the voice data to a text communication device in real-time.

10. A system for transcribing voice data into a text file, the system comprising:
   a voice encoder to digitally encode voice data articulated by an individual, wherein encoding data comprises providing an identifier that identifies the individual articulating the voice data;
   a communication network to transmit the voice data with the identifier via a wireless connection to a remote database;
   the remote database to store the voice data and the identifier, and to receive and maintain user preferences from an individual, wherein the user preferences govern a format of content delivery to the individual and identify one of three mechanisms of transcription that is preferred by the individual;
   a transcription service that utilizes an appropriate transcription mechanism from two automated computer programs and human transcription to translate the voice data into a text file, wherein the appropriate transcription mechanism is predetermined by the individual based on the user preferences submitted to the transcription service by the individual, and wherein the preferred transcription mechanism is selected from the three transcription mechanisms based on the received user preferences that correspond with the identifier of the individual when transmitted via the communication network, wherein the two automated computer programs include speaker independent transcription, and speaker dependent transcription; and a delivery component to deliver the text file or the voice data and the text file to a communication device, wherein the delivery is based on the user preferences that correspond with the identifier.

11. The system for transcribing voice data into a text file of claim 10, wherein the communication network is a circuit-based public switch telephone network.

12. The system for transcribing voice data into a text file of claim 10, wherein the communication network is a packet-based network.

13. The system for transcribing voice data into a text file of claim 10, further comprising a memory device to store the voice data prior to transmission over a communication network.

14. The system for transcribing voice data into a text file of claim 10, further comprising a delivery component to deliver the voice data to a text communication device.

15. The system for converting voice data into a text file of claim 10, wherein the one of the various automated computer programs that translates the voice data into a text file is an automated, speaker independent transcription computer program.

16. The system for converting voice data into a text file of claim 10, wherein the one of the various automated computer programs that translates the voice data into a text file is an automated, speaker dependent transcription computer program.

17. The system for converting voice data into a text file of claim 10, wherein the delivery component delivers the text file via one of the following methods in accordance with user preferences established within the delivery component: email, file transfer protocol (FTP), or hypertext transfer protocol (HTTP).

18. At least one non-transitory computer readable media having embodied thereon computer readable code for causing a computer to perform a method for converting voice data into a text file, the method comprising:

receiving voice data articulated by an individual into a voice communication device;

transmitting the voice data through a communication network to a database such that the voice data is associated with the individual, wherein transmitting comprises transmitting the voice data and an identification of the individual from the voice communication device through a wireless communication network to the database, wherein the individual is identified by associating the voice data with a pre-calibration utilizing the individual's speech patterns;

storing the voice data and the identification of the individual at the database;

receiving and maintaining user preferences from the individual at the database, wherein the user preferences govern a format of content delivery to the individual and identify one of three mechanisms of transcription that is preferred by the individual;

selecting the preferred transcription mechanism from three transcription mechanisms for processing the voice data the received user preferences that correspond with the identification of the individual providing the voice data, wherein the three transcription mechanisms are a speaker-independent transcription mechanism, a speaker-dependent transcription mechanism, and a human transcriber;

performing a selection based on the identification of the individual providing the voice data, wherein the individual is identified by associating voice data, which is transmitted over the communications network, with a pre-calibration utilizing the individual's speech patterns;

utilizing the preferred selected transcription mechanism for transcribing the voice data into a text file;

delivering the text file or the voice data and the text file to a communication device, wherein delivery is based on user preferences determined by the identifier; and based on the user preferences of the individual, delivering the voice data to the communication device.

19. At least one computer readable media of claim 18, wherein transmitting the voice data through a communication network further comprises transmitting the voice data through a circuit-based public switch telephone network.

20. At least one computer readable media of claim 18, wherein transmitting the voice data through a communication network further comprises transmitting the voice data through a packet-based communication network.

21. At least one computer readable media of claim 18, wherein transmitting the voice data through a communication network further comprises transmitting the voice data in real-time as the voice data is received into the voice communication device.

22. At least one computer readable media of claim 18, wherein the method further comprises storing the voice data within memory located in the voice communication device prior to transmitting the voice data through a communication network.

23. At least one computer readable media of claim 18, wherein the selected transcription mechanism for processing the voice data comprises an automated, speaker independent transcription computer program.

24. At least one computer readable media of claim 18, wherein the selected transcription mechanism for processing the voice data comprises an automated, speaker dependent transcription computer program, wherein the automated, speaker dependent transcription computer program is a transcription mechanism that is pre-calibrated by speech patterns of the individual to process the voice data.

25. At least one computer readable media of claim 18, wherein the selected transcription mechanism for processing the voice data comprises a human who listens to the voice data and manually transcribes into a text file that is invoked in addition to the speaker-dependent transcription mechanism.

26. At least one computer readable media of claim 18, wherein delivering the text file to a text communication device comprises one of the following methods: email, file transfer protocol (FTP), or hypertext transfer protocol (HTTP).

27. At least one computer readable media of claim 18, wherein delivering the text file to a text communication device further comprises delivering the voice data to a text communication device.

* * * * *

UNITED STATES PATENT AND TRADEMARK OFFICE
CERTIFICATE OF CORRECTION

| | | |
|---|---|---|
| PATENT NO. | : 8,265,930 B1 | Page 1 of 1 |
| APPLICATION NO. | : 11/104942 | |
| DATED | : September 11, 2012 | |
| INVENTOR(S) | : Bryce A. Jones and Ray Edward Dickensheets | |

It is certified that error appears in the above-identified patent and that said Letters Patent is hereby corrected as shown below:

ON THE TITLE PAGE:

Item (75) Inventor(s): Please correct inventor name "Raymond Edward Dickensheets" to reflect "Ray Edward Dickensheets".

Signed and Sealed this
Twentieth Day of November, 2012

David J. Kappos
*Director of the United States Patent and Trademark Office*